(12) United States Patent
Ishijima

(10) Patent No.: US 8,026,974 B2
(45) Date of Patent: Sep. 27, 2011

(54) IMAGING APPARATUS, METHOD AND PROGRAM

(75) Inventor: Minoru Ishijima, Tokyo (JP)

(73) Assignee: Sony Corporation (JP)

( * ) Notice: Subject to any disclaimer, the term of this patent is extended or adjusted under 35 U.S.C. 154(b) by 470 days.

(21) Appl. No.: 12/228,219

(22) Filed: Aug. 11, 2008

(65) Prior Publication Data

US 2009/0046197 A1    Feb. 19, 2009

(30) Foreign Application Priority Data

Aug. 17, 2007  (JP) ................................ P2007-213109

(51) Int. Cl.
*H04N 5/232* (2006.01)
(52) U.S. Cl. ...................................................... 348/346
(58) Field of Classification Search .......... 348/169–172, 348/345, 346, 333.01; 396/281, 283, 373
See application file for complete search history.

(56) References Cited

U.S. PATENT DOCUMENTS

| 6,327,376 B1 * | 12/2001 | Harkin ........................... 382/124 |
| 7,170,558 B2 * | 1/2007 | Yokota et al. .................. 348/337 |
| 2004/0012682 A1 * | 1/2004 | Kosaka et al. ........... 348/207.99 |
| 2004/0135915 A1 * | 7/2004 | Ueda et al. ..................... 348/335 |

FOREIGN PATENT DOCUMENTS

| JP | 5-095501 A | 4/1993 |
| JP | 2004-040712 A | 2/2004 |

* cited by examiner

*Primary Examiner* — Lin Ye
*Assistant Examiner* — Trung Diep
(74) *Attorney, Agent, or Firm* — Lerner, David, Littenberg, Krumholz & Mentlik, LLP

(57) ABSTRACT

An imaging apparatus that images an image with a solid-state imaging device includes an area defining section that defines an unnecessary image detection area, which may contain an unnecessary image, at a position along an outer edge of an imaged image obtained by the solid-state imaging device, a focus evaluation value calculating section that calculates a focus evaluation value, which indicates the focal degree, based on an image signal of the imaged image obtained through a gradually moved focus lens, an unnecessary image detection processing section that determines that the imaged image contains the unnecessary image if the focus evaluation value calculated based on an image signal in the unnecessary image detection area has a peak while the focus lens is moving, and a warning processing section that performs processing for warning a photographer of the fact that the unnecessary image is contained if it is determined.

12 Claims, 13 Drawing Sheets

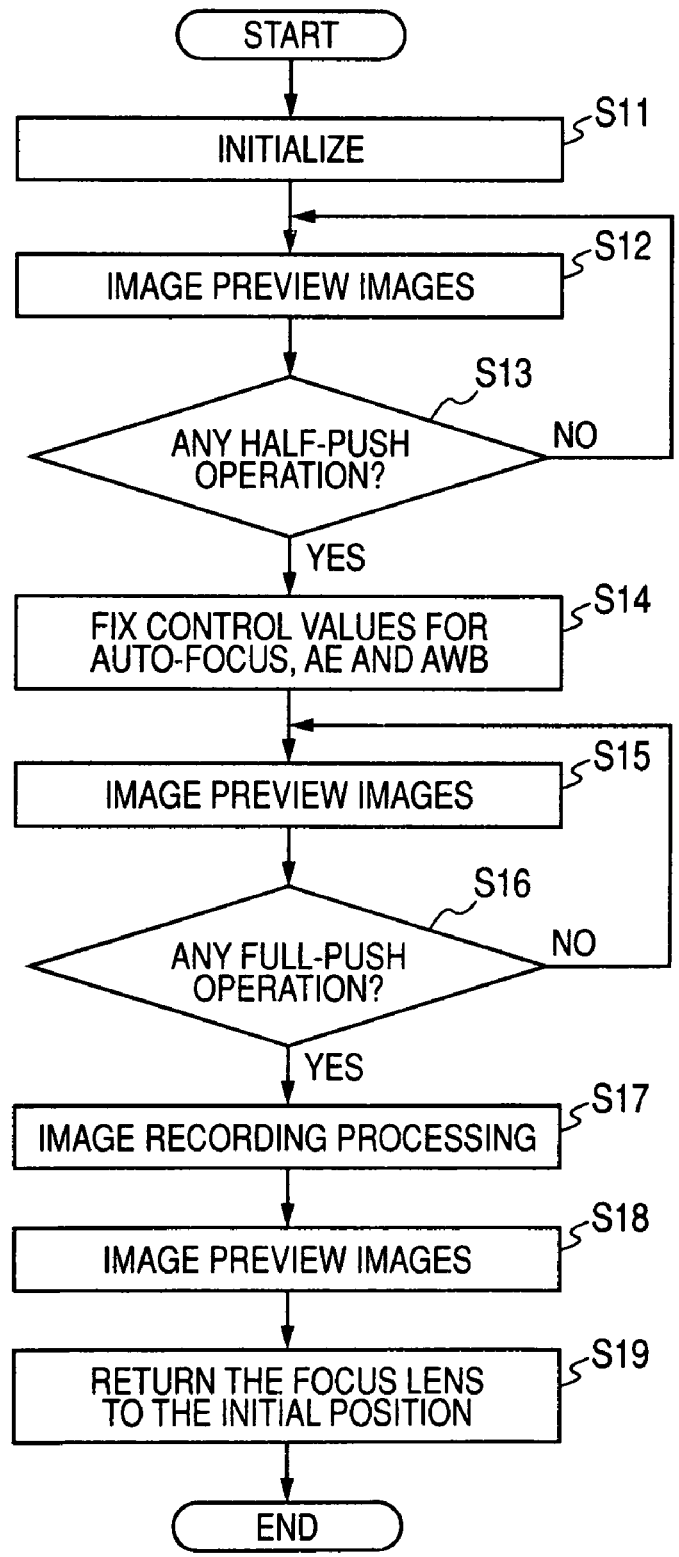

ated on Aug. 17, 2007, the entire content of which is incorporated herein by reference.

IMAGING APPARATUS, METHOD AND PROGRAM

CROSS-REFERENCE TO RELATED APPLICATIONS

The present application claims priority from Japanese Patent Application No. JP 2007-213109, filed in the Japanese Patent Office on Aug. 17, 2007, the entire content of which is incorporated herein by reference.

BACKGROUND OF THE INVENTION

1. Field of the Invention

The present invention relates to an imaging apparatus that images an image with a solid-state imaging device and an imaging method and imaging program therefor, and it particularly relates to an imaging apparatus, method and program that allow detection of unnecessary image contained in an imaged image.

2. Description of the Related Art

In recent years, digital imaging apparatus such as digital still cameras and digital video cameras are widely spread. Most of recent various mobile machines such as cellular phones also include an imaging function.

Such imaging apparatus and mobile machines have been strongly demanded the decreases in size and/or thickness. For that reason, it may be important to decrease the size of each of function blocks for imaging and efficiently lay out the function blocks without losing the operability. For example, in some cellular phone including a camera module, the thickness of the shut cabinets is decreased by placing the camera module near a connecting part with a transmitter cabinet within a receiver cabinet and fitting the unit including the camera module into a recess of the transmitter cabinet when they are shut (refer to JP-A-2007-67744 (Paragraphs [0045] to [0052] and FIG. 6) (Patent Document 1), for example).

However, a user's finger may be placed on an imaging lens during imaging when strict constraints are imposed on the layout of the function blocks for imaging in order to meet the demands of decreases in size and/or thickness. For example, the constraints may place an imaging lens in the same direction as that of the position where a user may hold the imaging apparatus. Particularly in a cellular phone, a release button and an imaging lens might be placed closely. In this case, an image of a user's finger may be contained in the imaged image.

In order to prevent the problem, a camera system has been proposed that prestores pattern images containing unnecessary images and warns a photographer of the existence of an unnecessary image if it is determined that a pattern image is contained in the image imaged in an infrared mode (refer to JP-A-2005-191948 (Paragraphs [0033] to [0041] and FIG. 2) (Patent Document 2), for example).

SUMMARY OF THE INVENTION

As described above, a mobile machine including an imaging function may strictly limit the position where an imaging lens, for example, is to be placed for decreases in size and/or thickness, and a user's finger may be on the imaging lens during imaging. In order to solve the problem, it is important in the technology of Patent Document 2 to image and register a pattern image of a finger, for example, which may complicate operations, however. Furthermore, since it is important to shield visible light and detect infrared rays immediately before imaging, a control mechanism therefore may be necessary, which may disadvantageously increase the size and/or manufacturing costs of the machine.

Accordingly, it is desirable to provide an imaging apparatus, method and program that allow warning a photographer through simple processing of the fact that an unnecessary image has been imaged due to the imaging of a finger of the photographer, for example.

According to an embodiment of the present invention, there is provided an imaging apparatus that images an image with a solid-state imaging device, the apparatus including an area defining section that defines an unnecessary image detection area, which may contain an unnecessary image, at a position along an outer edge of an imaged image obtained by the solid-state imaging device, a focus evaluation value calculating section that calculates a focus evaluation value, which indicates the focal degree, based on an image signal of the imaged image obtained through a gradually moved focus lens, an unnecessary image detection processing section that determines that the imaged image contains the unnecessary image if the focus evaluation value calculated based on an image signal in the unnecessary image detection area has a peak while the focus lens is moving, and a warning processing section that performs processing for warning a photographer of the fact that the unnecessary image is contained if it is determined.

In such an imaging apparatus, an unnecessary image detection area, which may contain an unnecessary image, is defined by an area defining section at a position along an outer edge of an imaged image obtained by the solid-state imaging device. A focus evaluation value calculating section calculates a focus evaluation value, which indicates the focal degree, based on an image signal of the imaged image obtained through a gradually moved focus lens. An unnecessary image detection processing section determines that the imaged image contains the unnecessary image if the focus evaluation value calculated based on an image signal in the unnecessary image detection area has a peak while the focus lens is moving. A warning processing section performs processing for warning a photographer of the fact that the unnecessary image is contained if it is determined.

The imaging apparatus according to an embodiment of the invention allows detection of an unnecessary image by simple processing and secure warning of the fact to a photographer in a short period of time since whether an unnecessary image is contained or not is determined based on the focus evaluation value calculated by using an image signal in an unnecessary image detection area defined on an imaged image.

BRIEF DESCRIPTION OF THE DRAWINGS

FIG. 7 is a flowchart describing a flow of a basic routine in the imaging apparatus from powering-on until an imaging operation is performed;

DESCRIPTION OF THE PREFERRED EMBODIMENTS

An embodiment of the invention will be described in detail below with reference to an example and drawings in which the embodiment is applied to an imaging apparatus having a still-picture imaging function such as a digital still camera.

Figure 1:
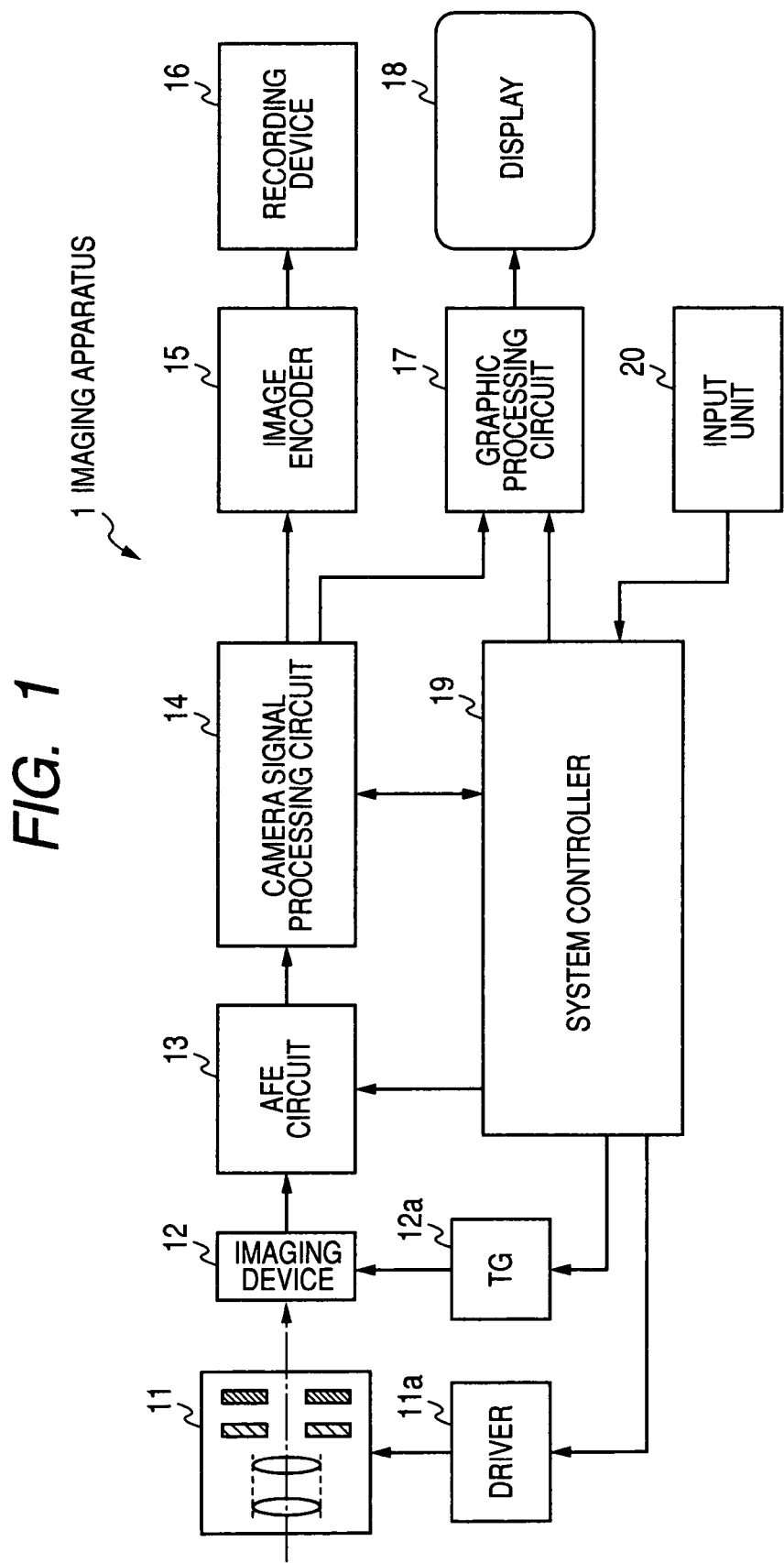
FIG. 1 is a block diagram showing an internal configuration of an imaging apparatus according to an embodiment of the invention.

FIG. 1 is a block diagram showing an internal configuration of an imaging apparatus according to an embodiment of the invention.

An imaging apparatus 1 shown in FIG. 1 includes an optical block 11, a driver 11a, an imaging device 12, a timing generator (TG) 12a, an analog front end (AFE) circuit 13, a camera signal processing circuit 14, an image encoder 15, a recording device 16, a graphic processing circuit 17, a display 18, a system controller 19 and an input unit 20.

The optical block 11 has a lens for collecting light from a subject to the imaging device 12, a drive mechanism for focusing and/or zooming by moving the lens, a shutter mechanism, and an iris mechanism. The driver 11a controls the driving of each of the mechanisms within the optical block 11 based on a control signal from the system controller 19.

The imaging device 12 may be a CCD (Charge Coupled Device) type or CMOS (Complementary Metal Oxide Semiconductor) type solid-state imaging device, for example, and is driven based on the timing signal output from the TG 12a and converts incident light from a subject to an electric signal. The TG 12a outputs a timing signal under the control of the system controller 19.

The AFE circuit 13 samples and holds an image signal output from the imaging device 12 so as to keep a good S/N (Signal/Noise) ratio by CDS (Correlated Double Sampling) processing, controls the gain by AGC (Auto Gain Control) processing, performs A/D conversion thereon, and outputs digital image data.

The camera signal processing circuit 14 performs AF (Auto Focus), AE (Auto Exposure), detection processing for image quality correction processing and image quality correction processing according to the signal output from the system controller 19 based on the detection information on image data from the AFE circuit 13. The camera signal processing circuit 14 may have detection functions including a function of detecting the level of a brightness component or a color component of each area on an image and a function of detecting an AF evaluation value (such as a contrast) for each area, for example. The image quality function may be a function of adjusting a white balance (WB), for example.

The image encoder 15 compresses and encodes image data output from the camera signal processing circuit 14 and outputs the encoded data to the recording device 16. More specifically, the image encoder 15 may compress and encode image data for one frame, which is processed by the camera signal processing circuit 14, according to an encoding method such as JPEG (Joint Photographic Experts Group) and output the encoded data of a still image. The image encoder 15 may compress and encode data of not only a still picture but also moving pictures.

The recording device 16 is a device that records encoded data from the image encoder 15 as an image file and is implemented as a drive device for a portable recording medium such as a magnetic tape and an optical disk or an HDD (Hard Disk Drive), for example.

The graphic processing circuit 17 converts image data output from the camera signal processing circuit 14 to a signal for displaying it on the display 18 and supplies the signal to the display 18. The graphic processing circuit 17 further has a function of synthesizing and displaying the image requested from the system controller 19 onto an image from the camera signal processing circuit 14, such as a warning image, which will be described later. The display 18 may include an LCD (Liquid Crystal Display), for example, and displays the image based on an image signal from the graphic processing circuit 17.

The system controller 19 is configured as a microcomputer including a CPU (Central Processing Unit), and a memory such as a ROM (Read Only Memory) and a RAM (Random Access Memory) and executes a program stored in the memory to centrally control the imaging apparatus 1. For example, the system controller 19 may control a mechanism within the optical block 11, the driving timing for the imaging device 12 and a gain in the AFE circuit 13 based on a detection result by the camera signal processing circuit 14 and controls the AF and/or AE thereby. The system controller 19 may further control an operation of the image quality correction function in the camera signal processing circuit 14 by automatically adjusting a WB (which is called Auto White Balance: AWB) based on the detection result.

The input unit 20 includes an input switch such as a shutter release button and outputs a control signal according to an operation input by a user on the input switch to the system controller 19.

In the imaging apparatus 1 in the configuration described above, the signals of the light received and optoelectrically converted by the imaging device 12 are sequentially supplied to the AFE circuit 13, undergo CDS processing and AGC processing and are converted to digital image data. The camera signal processing circuit 14 performs image quality correction processing on the image data supplied from the AFE circuit 13, and the processed image data is supplied to the graphic processing circuit 17 and is converted to an image signal for display. Thus, the image being currently imaged (or a preview image) is displayed on the display 18, and a photographer can visually recognize the image and check the angle of view.

Under this state, by pressing the shutter release button (not shown) of the input unit 20, for example, to instruct the system controller 19 to record an image, the image data from the signal processing circuit 14 is supplied to the image encoder 15 and undergoes compression and encoding processing. Then, the compressed image data is recorded in the recording device 16. In order to record a still image, image data for one frame is supplied from the camera signal processing circuit 14 to the image encoder 15. In order to record moving pictures, processed image data pieces are serially supplied to the image encoder 15.

Figure 2A:
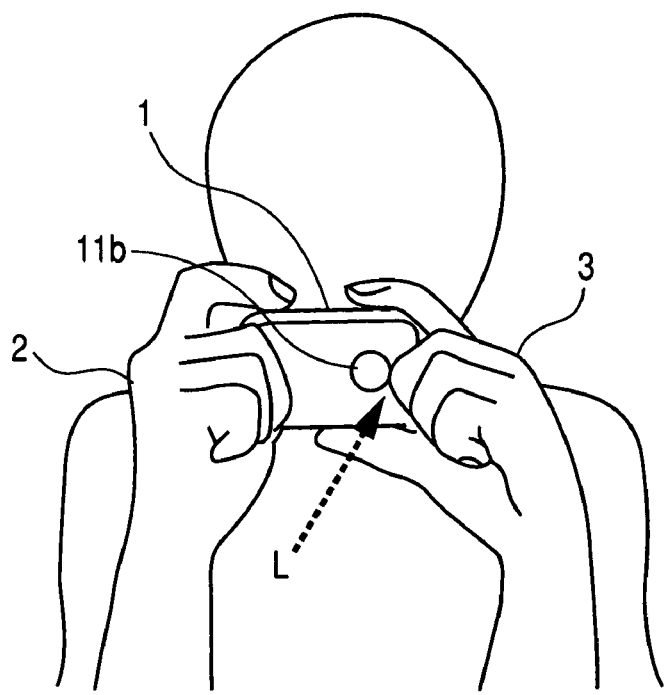
FIGS. 2A and 2B are diagrams showing an example of the usage of the imaging apparatus.
Figure 2B:
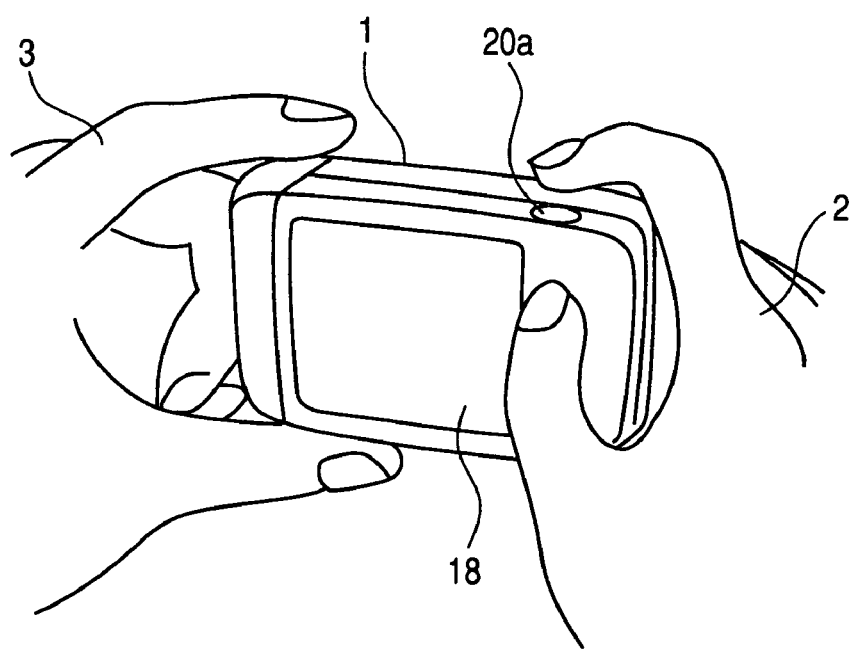

Next, the warning processing in the imaging apparatus 1 will be described in a case that an unnecessary image is detected in imaging a still picture. FIGS. 2A and 2B are diagrams showing an example of the usage of the imaging apparatus.

In the examples in FIGS. 2A and 2B, a photographer holds the imaging apparatus 1 with the right hand 2 and the left hand 3 to photograph. As shown in FIG. 2B, the imaging apparatus 1 includes the display 18 for checking a preview image on the surface on the photographer side. A shutter release button 20a is placed in the upper right direction of the display 18, and a photographer may push the shutter release button 20a with a finger of the right hand 2.

On the other hand, in this example as shown in FIG. 2A, an imaging lens 11b is placed at a position close to the right end when viewed from the direction of a subject. For that reason, a part (at the position indicated by the arrow L in FIG. 2A) of a finger of the left hand 3 holding the imaging apparatus 1 may cover and hide the imaging lens 11b. When the shutter release button 20a is pushed under the condition, an image of the finger may be contained in the imaged image.

Figure 3A:
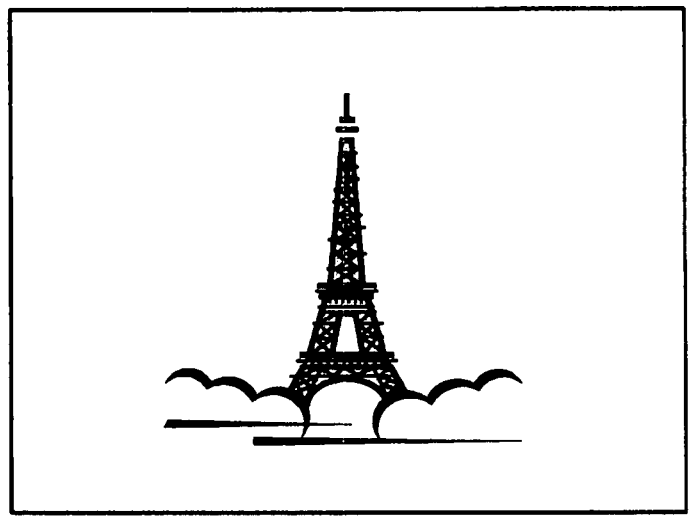
FIGS. 3A to 3C are diagrams showing examples of images containing an image of a finger.
Figure 3B:
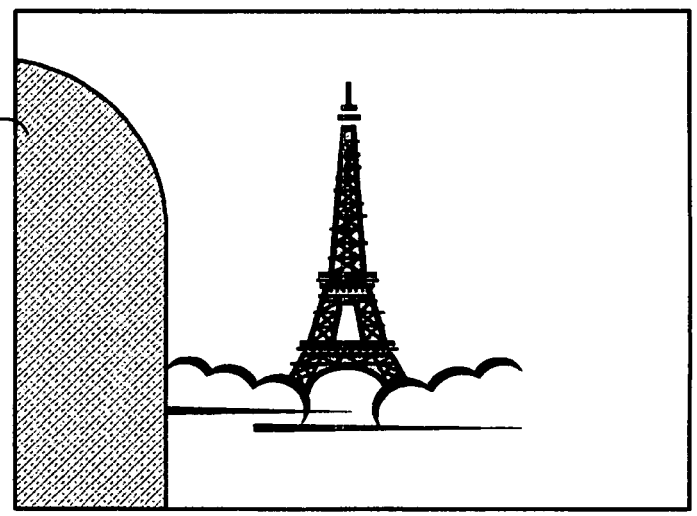
Figure 3C:
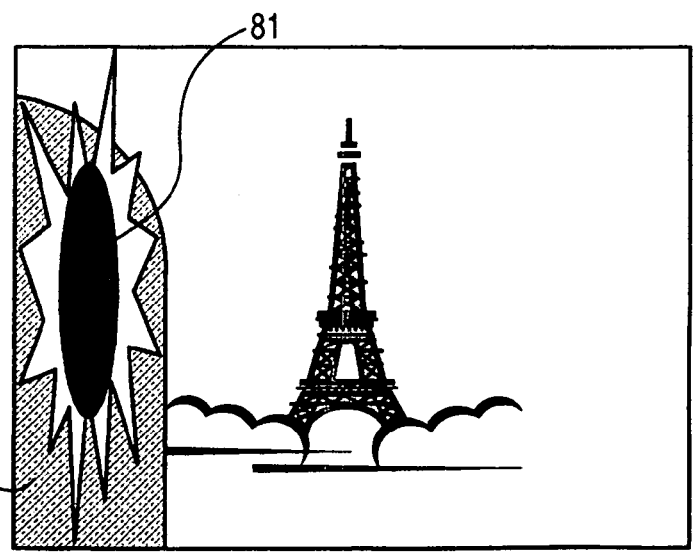

FIGS. 3A to 3C are diagrams showing examples of images containing an image of a finger.

FIG. 3A shows an example of the image without an image of a finger when a subject is imaged. FIG. 3B shows an image containing an image of a finger 3a of the left hand 3 when the same subject is imaged.

The imaging apparatus 1 of this embodiment has a function of detecting a state that an imaged image contains an unnecessary image as shown in FIG. 3B. Particularly herein, an image of an object near the imaging lens 11b, such as a finger of a photographer, in an imaged image is detected as an unnecessary image. Then, if an unnecessary image is detected, the fact may be warned to a photographer by using an image, for example. In the example in FIG. 3C, the fact that an unnecessary image has been detected is notified to a photographer by displaying a warning image 81 in a predetermined color at the position corresponding to the area having an image of the finger 3a on the display 18. The warning image 81 may brink, for example. Alternatively, the method for warning the detection of an unnecessary image may not be limited to methods by visually warning with an image, for example, but may be warning by voice, for example.

Figure 4:
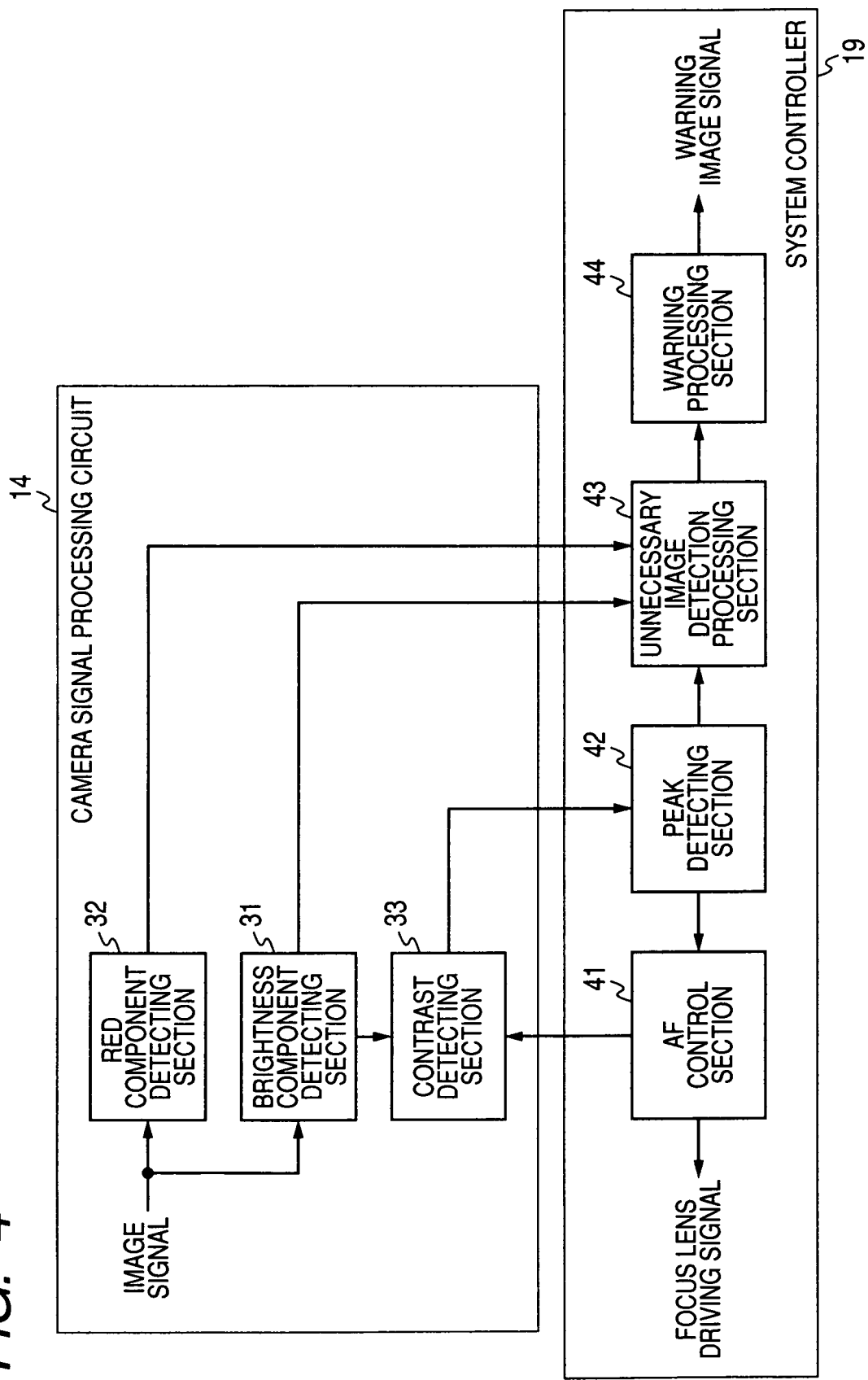
FIG. 4 is a block diagram showing functions provided in the imaging apparatus for detection of an unnecessary image.

FIG. 4 is a block diagram showing functions provided in the imaging apparatus for detection of an unnecessary image.

The imaging apparatus 1 includes, as functions for detection of an unnecessary image, a brightness component detecting section 31, a red component detecting section 32, a contrast detecting section 33, an AF control section 41, a peak detecting section 42, an unnecessary image detection processing section 43 and a warning processing section 44. According to this embodiment, the functions of the brightness component detecting section 31, red component detecting section 32 and contrast detecting section 33 among those functions are implemented as hardware circuits provided in the camera signal processing circuit 14. The functions of the AF control section 41, peak detecting section 42, unnecessary image detection processing section 43 and warning processing section 44 are implemented by software processing in the system controller 19.

The brightness component detecting section 31 detects the level of a brightness signal (or brightness level) converted and generated from the image signal obtained by the imaging device 12. The red component detecting section 32 detects the signal level of the red component (or red component level) among the RGB (Red, Green and Blue) components of an image signal. The brightness component detecting section 31 and the red component detecting section 32 have functions of calculating the average value for each of predetermined areas by using the detected brightness level and red component level. More specifically, the brightness component detecting section 31 and the red component detecting section 32 can separately calculate the average values of the brightness level and the red component level in an unnecessary image detection area and the other area, which will be described later.

The contrast detecting section 33 is a block that calculates the value of contrast as an AF evaluation value for evaluating a focal degree of the focus. The contrast value is obtained as a difference between the minimum value and the maximum value of the brightness level in a predetermined area within an image. The contrast detecting section 33 can separately calculate the contrast values for an unnecessary image detection area and the other area.

The functions of the brightness component detecting section 31, red component detecting section 32, and contrast detecting section 33 or a part of the functions may be implemented by software processing in the system controller 19.

The AF control section 41 is a block that drives the focus lens within the optical block 11 and controls an operation for AF. When the shutter release button 20a is pushed to an approximately half depth (or half-pushed), the AF control section 41 causes the contrast detecting section 33 to detect a contrast by gradually moving the focus lens across an entire movable area. The focus is automatically achieved by moving the focus lens to the position where the contrast value is at a maximum.

Under the control of the AF control section 41, the peak detecting section 42 detects the position (or peak position) where the contrast value is at a maximum when the contrast is detected by the contrast detecting section 33 by gradually moving the focus lens and notifies the AF control section 41 of the detection result. The peak detecting section 42 is capable of separately detecting the peak positions for an unnecessary image detection area and the other area.

The unnecessary image detection processing section 43 detects an unnecessary image from an imaged image based on detection results from the brightness component detecting section 31 and red component detecting section 32 and a detection result from the peak detecting section 42 and outputs the detection result to the warning processing section 44.

Notably, the processing functions of those peak detecting section 42 and unnecessary image detection processing section 43 or a part of those functions may be implemented by a hardware circuit provided in the camera signal processing circuit 14.

When an unnecessary image is detected by the unnecessary image detection processing section 43, the warning processing section 44 outputs a signal of a warning image for notifying a photographer of the fact to the graphic processing circuit 17, and the warning image is synthesized to and displayed on the imaged image.

Figure 5A:
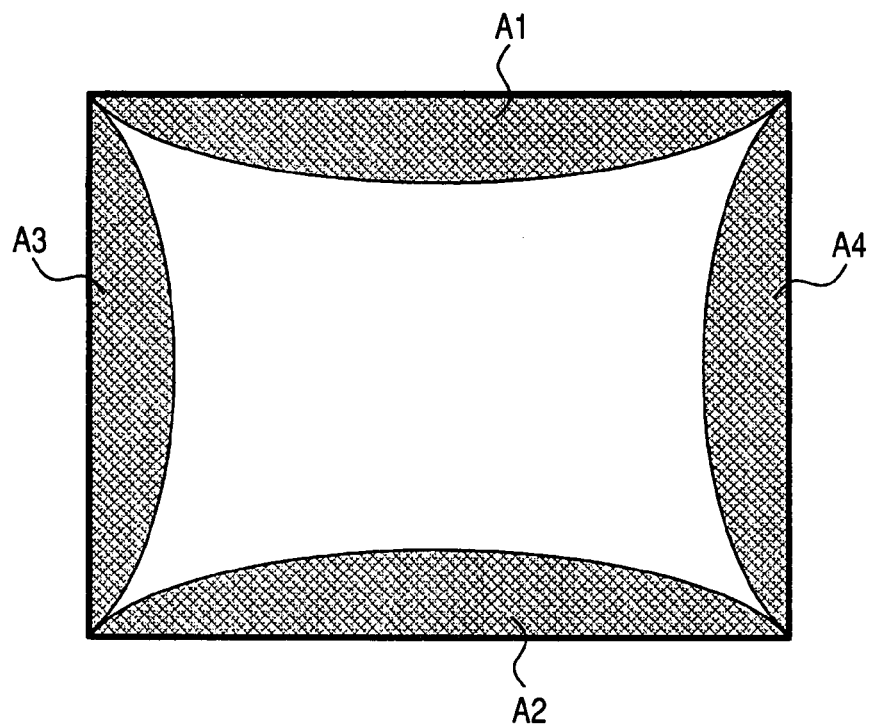
FIGS. 5A and 5B are diagrams showing an example of definition of an unnecessary image detection area.
Figure 5B:
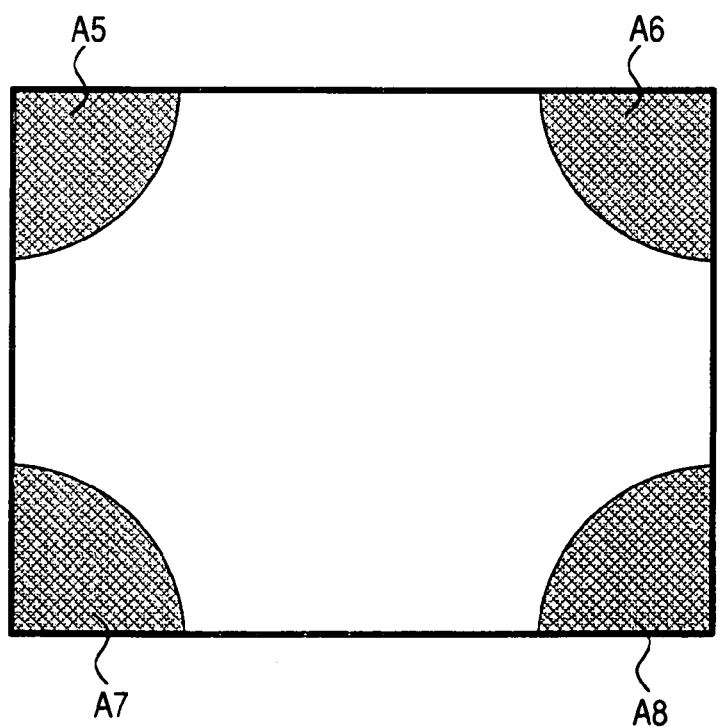

FIGS. 5A and 5B are diagrams showing an example of definition of an unnecessary image detection area.

An unnecessary image detection area subject to detection of an unnecessary image such as an image of a finger is predefined in the imaging apparatus 1. The unnecessary image detection area may be an area along an outer edge of an imaged area and may be, for example, an area along one side of an imaged area, such as areas A1 to A4 in FIG. 5A, or an area having an apex of an imaged area substantially at the center, such as areas A5 to A8 in FIG. 5B.

In a real imaging operation, one area of the areas A1 to A8 may be selected as the unnecessary image detection area and may be defined for the brightness component detecting section 31 and red component detecting section 32. Here, multiple areas such as the areas A1 to A8 are definable in the camera signal processing circuit 14 as the unnecessary image detection area. Then, prior to shipment of a product, one area among them may be stored in a ROM, for example, within the system controller 19. In this case, an area in which an image of a finger may be easily contained is preselected according to the specifications of the imaging apparatus 1, such as the position of the imaging lens 11b on the cabinet and the positional relationship between the imaging lens 11b and the shutter release button 20a. Then, when the imaging apparatus 1 is used, such as upon initialization immediately after powering on, the selected one area is defined as an unnecessary image detection area for the brightness component detecting section 31 and red component detecting section 32 by the system controller 19. The unnecessary image detection area may be arbitrarily defined according to an operation input by a photographer.

Figure 6A:
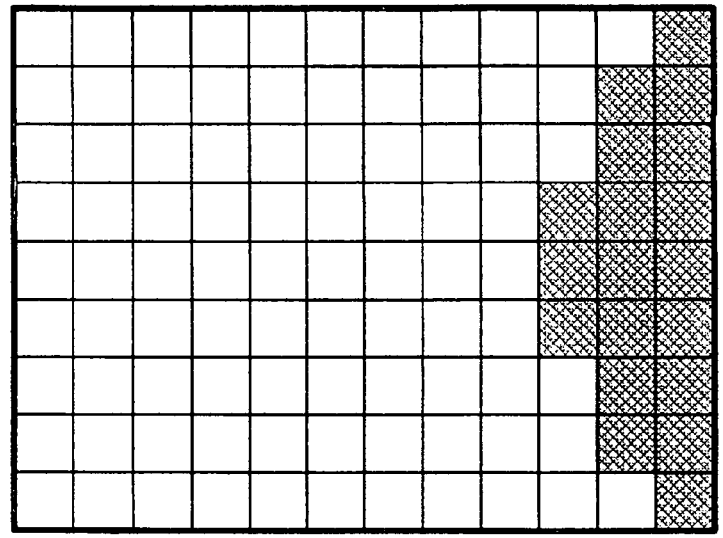
FIGS. 6A and 6B are diagrams showing an example of definition in a case where the unnecessary image detection area is to be selected from divided areas.
Figure 6B:
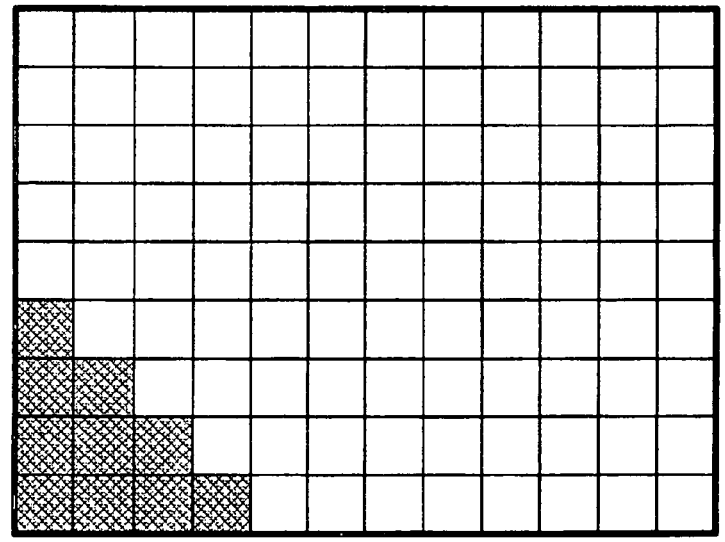

FIGS. 6A and 6B are diagrams showing an example of definition in a case where the unnecessary image detection area is to be selected from divided areas.

In the example in FIGS. 6A and 6B, an imaged area is divided in advance into multiple areas (horizontal 12 areas and vertical 9 areas here). In the imaging apparatus 1 as described above, one or more arbitrary areas may be selected from the divided areas and be defined as an unnecessary image detection area. In FIGS. 6A and 6B, the shaded divided areas are defined as an unnecessary image detection area. FIG. 6A shows an example in which the area substantially corresponding to the area A4 in FIG. 5A is defined as an unnecessary image detection area. FIG. 6B shows an example in which the area substantially corresponding to the area A7 in FIG. 5B is defined as an unnecessary image detection area. By doing so, the number of definable patterns of unnecessary image detection area can be easily increased, and the function of detecting an unnecessary image is applicable to many types of imaging apparatus 1 under different specifications, such as the position of the imaging lens 11b.

The brightness level and/or red component level may be detected from signals of all pixels within each of the divided areas. Alternatively, by thinning out pixels within each of the areas for the detection, the speed of the detection processing can be increased though the precision of detection may decrease. The precision of detection can be increased by increasing the number of divided areas within an imaged area though the processing speed may decrease.

Next, a routine for detecting an unnecessary image will be described more specifically. FIG. 7 is a flowchart describing a flow of a basic routine in the imaging apparatus from powering-on until an imaging operation is performed.

First of all, in the imaging apparatus 1 upon powering on, initialization processing is performed on the entire imaging apparatus 1 (step S11). The processing may include definition of an unnecessary image detection area and/or definition of a detection level indicating the degree of the detection, as will be described later.

When the initialization processing completes and a state allowing imaging is obtained, imaging preview images is started in the imaging apparatus 1 (step S12). The preview images are displayed on the display 18 at all times. Under the state, when a half-push operation is performed on the shutter release button 20a by a photographer (step S13), the system controller 19 performs control processing over auto-focus, AE and AWB, and the control values are fixed at proper values (step S14).

Under this state, the imaging of preview images are continued (step S15), and when the shutter release button 20a is pushed completely (or fully) by a photographer (step S16), processing of recording an imaged image signal is performed (step S17). In this case, the image signal output from the camera signal processing circuit 14 undergoes encoding processing for recording by the image encoder 15 and is then recorded in the recording device 16.

After that, imaging preview images is started again (step S18), and the fixed state of the control values in step S14 is cancelled. Here, the focus lens is returned to the initial position under the control of the system controller 19 (step S19).

Figure 8:
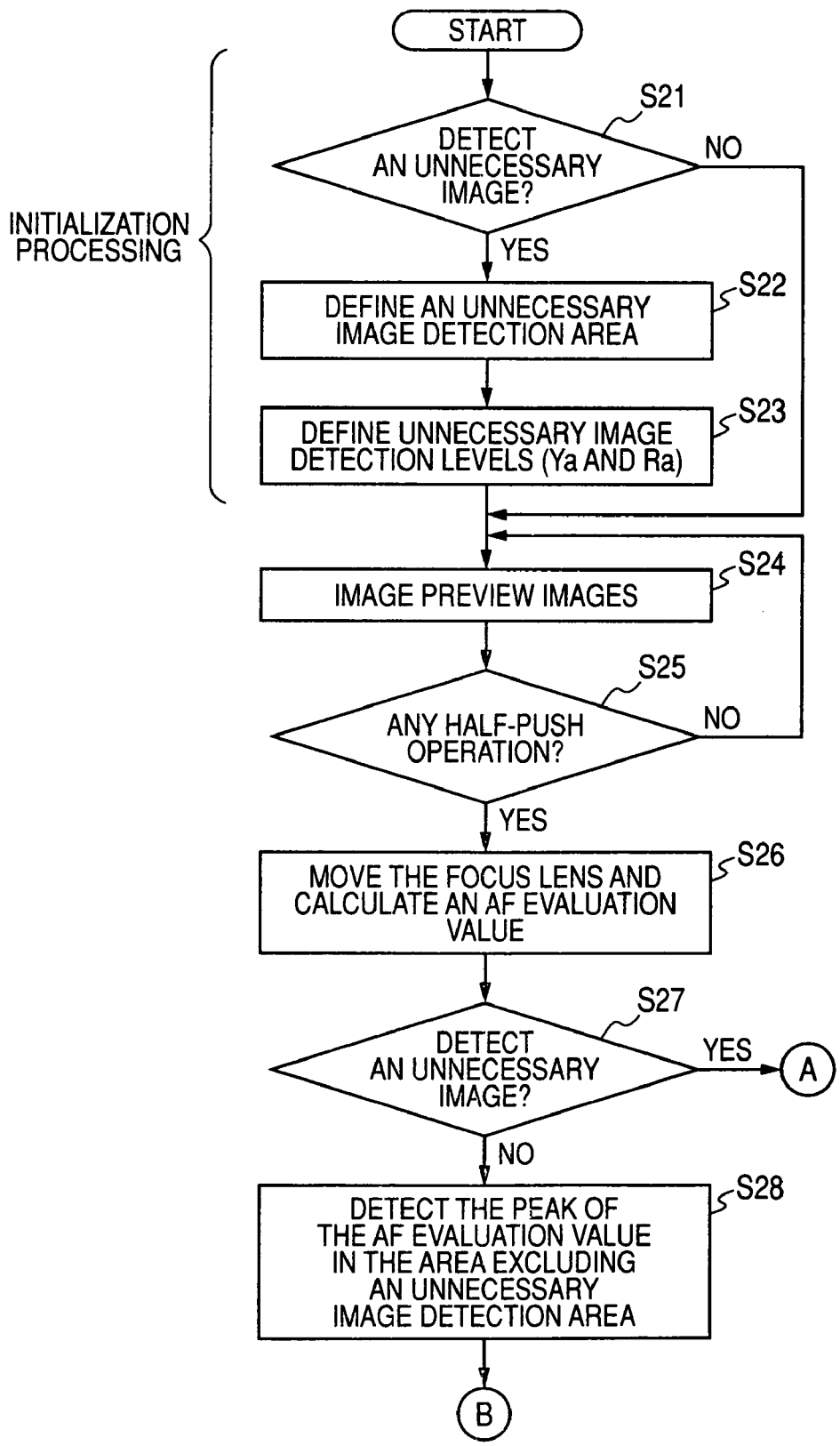
FIG. 8 is a flowchart (#1) describing a flow of a routine relating to unnecessary image detection.
Figure 9:
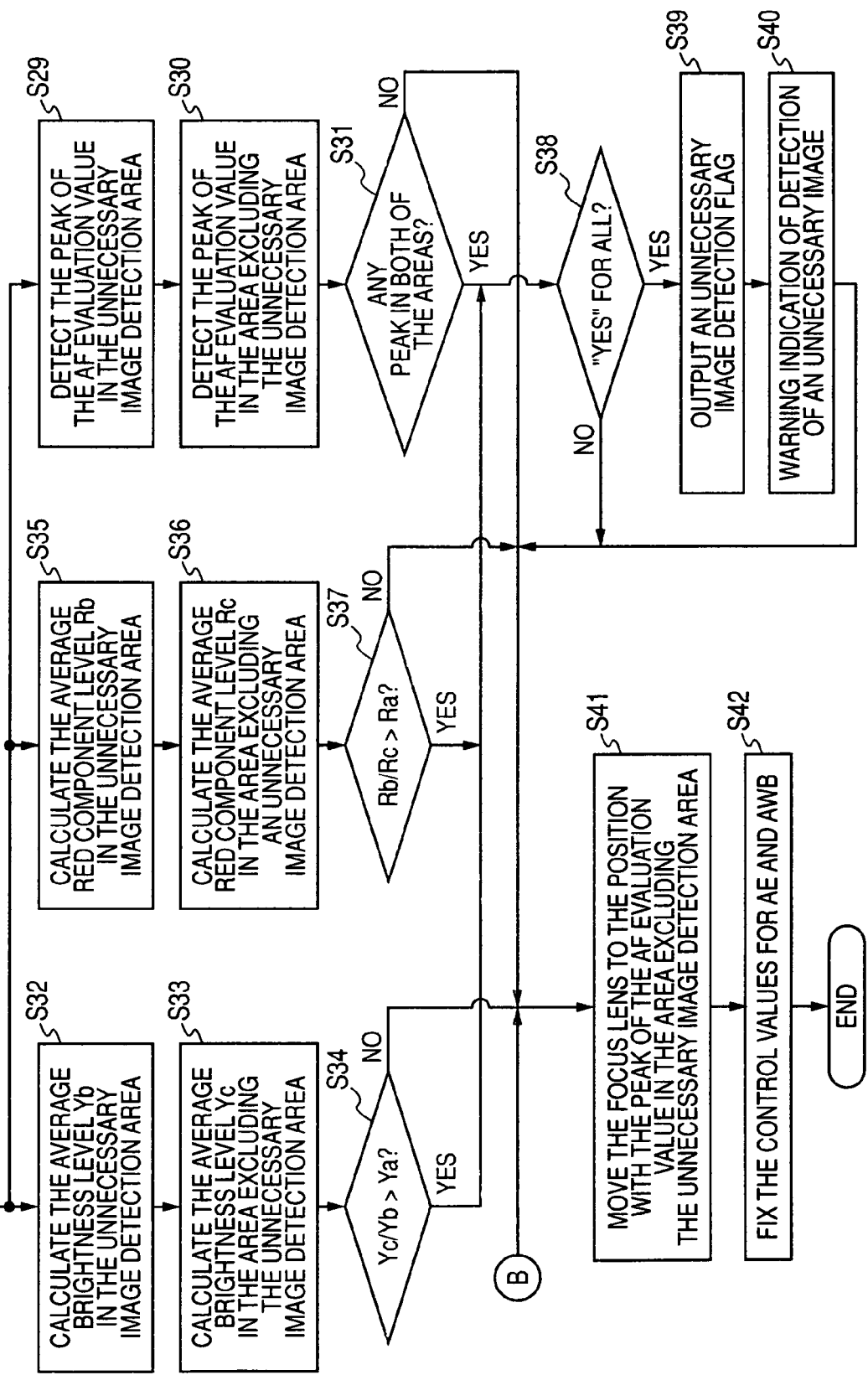
FIG. 9 is a flowchart (#2) describing a flow of a routine relating to unnecessary image detection.
Figure 10A:
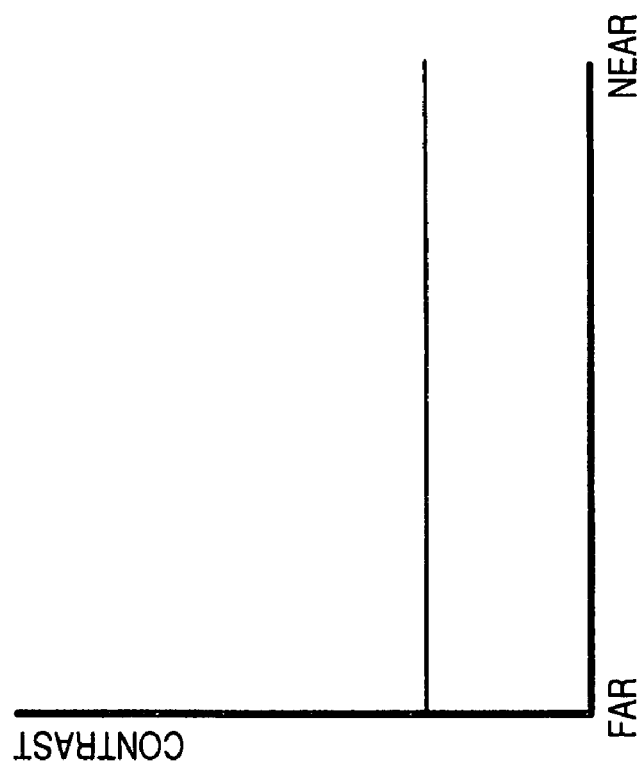
FIGS. 10A and 10B are diagrams showing examples of results of the detection of contrasts in a case where no unnecessary image is contained.
Figure 10B:
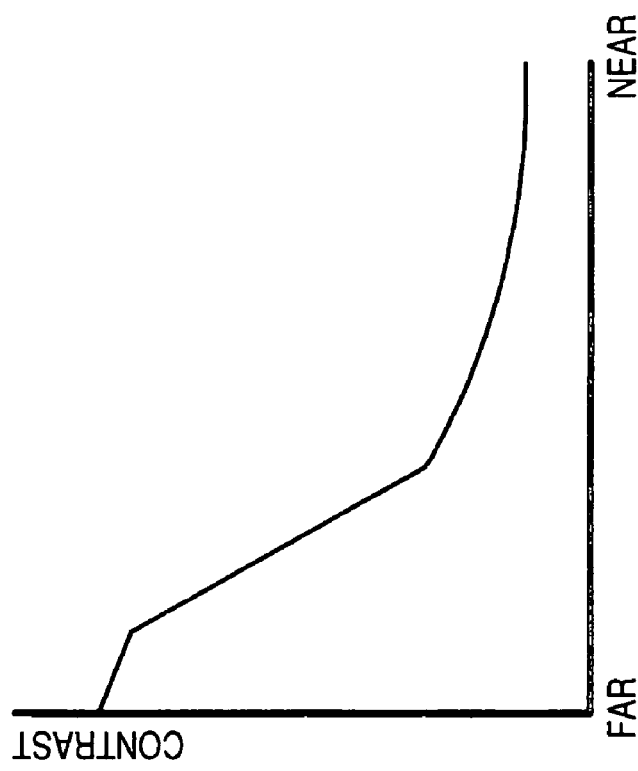

FIGS. 8 and 9 are flowcharts describing flows of routines relating to unnecessary image detection.

The processing in step S21 to S23 in FIG. 8 is performed as a part of the initialization processing in step S11 in FIG. 7. First of all, the system controller 19 determines whether unnecessary image detection processing is to be performed or not (step S21). The determination in this processing may be based on whether an operation mode that detects and warns an unnecessary image is being currently set or not, for example.

Here, if the unnecessary image detection processing is not set to perform, the processing in steps S22 and S23 is not performed. If the unnecessary image detection processing is to be performed on the other hand, the system controller 19 defines an unnecessary image detection area for the brightness component detecting section 31 and red component detecting section 32 with reference to the setting information of the ROM (step S22). The detection levels Ya and Ra indicating the degrees of detection of an unnecessary image are loaded from the setting information of the ROM and are defined as the setting information for the unnecessary image detection processing section 43 (step S23).

The detection levels Ya and Ra are threshold values for performing determination processing based on the brightness level and the red component level in order to detect an unnecessary image. In this case, proper values according to the specifications of the imaging apparatus 1 are prestored in the ROM. It is important that both of the detection levels Ya and Ra are values equal to or higher than 1, as will be described later.

The processing in steps S21 to S23 above is automatically performed in the initialization processing and defines proper values as the unnecessary image detection area and the detection levels Ya and Ra according to the specifications of the imaging apparatus 1. The processing steps may be performed in transition to the operation mode that detects and warns an unnecessary image during operation of the imaging apparatus 1.

After the completion of the initialization processing, imaging of preview images is started (step S24), and whether a half-push operation is performed on the shutter release button 20a during the imaging or not is determined (step S25). Steps S24 and S25 correspond to steps S12 and S13.

If a half-push operation is performed on the shutter release button 20a, the AF control section 41 sequentially moves the focus lens across the entire movable area and controls to calculate an AF evaluation value for each movable position setting (step S26). According to this embodiment, a contrast based on a brightness component is used as the AF evaluation value. Therefore, in this step, the brightness component detecting section 31 detects the brightness level at each movable position setting of the focus lens, and the contrast detecting section 33 detects the contrast based on the detection result. Here, the brightness component detecting section 31 separately detects the brightness levels for the unnecessary image detection area defined in step S22 and the other area. The contrast detecting section 33 also detects the contrast for each of the areas. The results of the contrast detection for movable position settings are sequentially output to the peak detecting section 42.

Next, the system controller 19 determines whether unnecessary image detection processing is to be performed or not (step S27), as in step S21. Here, if it is determined that the unnecessary image detection processing is not to be performed, the peak detecting section 42 detects the peak of the AF evaluation value (contrast) for the area excluding the unnecessary image detection area (step S28). In this processing, the peak is detected by detecting the position where the value of the contrast detected with the movement of the focus lens decreases after it gradually increases. After that, the AF control section 41 performs processing in step S41.

On the other hand, if it is determined in step S27 that the unnecessary image detection processing is to be performed, the peak detecting section 42 detects the peak of the AF evaluation value (contrast) in the unnecessary image detection area (step S29) and detects the peak of the AF evaluation value (contrast) in the other area (step S30). The unnecessary image detection processing section 43 determines whether the peaks in both of the unnecessary image detection area and the other area have been detected or not based on the detection results by the peak detecting section 42 (step S31).

The brightness component detecting section 31 calculates the average value of the brightness level detected in the unnecessary image detection area and outputs the average value as an average brightness level Yb to the unnecessary image detection processing section 43 (step S32). The brightness component detecting section 31 further calculates the average value of the brightness levels detected in the other area excluding the unnecessary image detection area and outputs the average value as an average brightness level Yc to the unnecessary image detection processing section 43 (step S33). The unnecessary image detection processing section 43 calculates Yc/Yb and compares the result with the detection level Ya defined in step S23 (step S34).

The red component detecting section 32 calculates the average value of the red component level detected in the unnecessary image detection area and outputs the average value as an average red component level Rb to the unnecessary image detection processing section 43 (step S35). The red component detecting section 32 further calculates the average value of the red component levels detected in the other area excluding the unnecessary image detection area and outputs the average value as an average red component level Rc to the unnecessary image detection processing section 43 (step S36). The unnecessary image detection processing section 43 calculates Rb/Rc and compares the result with the detection level Ra defined in step S23 (step S37).

The unnecessary image detection processing section 43 determines whether any unnecessary image has been detected or not based on the determination results in steps S31, S34 and S37 (step S38). Here, it is determined that some unnecessary image has been detected only if it is determined in step S31 that the peak of the AF evaluation value has been detected from both of the unnecessary image detection area and the other area, if it is determined in step S34 that the value of Yc/Yb is higher than the detection level Ya and if it is determined in step S37 that the value of Rb/Rc is higher than the detection level Ra.

In this case, the unnecessary image detection processing section 43 outputs an unnecessary image detection flag to the warning processing section 44 (step S39). The warning processing section 44 having received the flag outputs the signal of a warning image for warning that some unnecessary image has been detected to the graphic processing circuit 17 and displays the warning image on the display 18 (step S40).

After the warning image is displayed, the AF control section 41 performs control for focusing based on the result of detection of the peak of the AF evaluation value (contrast) from the area excluding the unnecessary image detection area, which is detected by the peak detecting section 42 (step S41). In other words, the focus lens is moved to the position with the peak AF evaluation value. Furthermore, the system controller 19 fixes the control values for AE and AWB (step S42). The processing in steps S41 and S42 corresponds to the processing in step S14 in FIG. 7, and if the full-push operation is performed on the shutter release button 20a after that, the processing of recording an imaged image signal is performed.

If one of the determination conditions for detecting an unnecessary image is not satisfied in step S38 (that is, if even one of them results in "No" in the determination processing in step S31, S34 or S37) and if the processing in step S28 is performed, the processing in steps S41 and S42 is performed sequentially without displaying a warning image.

In step S41, the focus lens is moved to the focused position based on the AF evaluation value from the area excluding the unnecessary image detection area. Thus, the focused condition can be achieved with high precision without any influence of an unnecessary image if any unnecessary image is detected. However, in a case where no unnecessary image is detected, the focused condition may be achieved based on the AF evaluation value from the entire area of an imaged image.

The brightness levels detected in steps S32 and S33 and the red component levels detected in steps S35 and S36 may be those detected by the brightness component detecting section 31 and the red component detecting section 32 when the focus lens is at a predetermined position. Alternatively, the brightness component detecting section 31 and the red component detecting section 32 may detect the brightness level and the red component level, respectively, by moving the focus lens again to the position where the peak of the AF evaluation value is detected in the area excluding the unnecessary image detection area in the processing at step S30.

Here, the processing of detecting an unnecessary image in step S38 will be described in more detail. FIGS. 10A and 10B and 11A and 11B are diagrams showing results of detection of contrasts in a case where an unnecessary image is not contained and in a case where an unnecessary image is contained.

As described above, the unnecessary image detection area is defined at a position along an outer edge of an imaged image area. For that reason, a main subject to be focused normally exists in the area excluding an unnecessary image detection area on an imaged image. Therefore, in a case where a contrast is detected from the area excluding an unnecessary image detection area and when the focus lens is moved from the tele-side to the wide side, the value of the contrast may have the peak at some position. In the example in FIG. 10A, the main subject may exist at an infinite distance, and the peak of the contrast occurs when the focus lens is positioned on the most tele-side.

On the other hand, if an unnecessary image is not contained, the subject to be focused does not exist in an unnecessary image detection area. Therefore, as in the example in FIG. 10B, the amount of change in contrast with the movement of the focus lens may be small, and the peak is not detected.

Figure 11A:
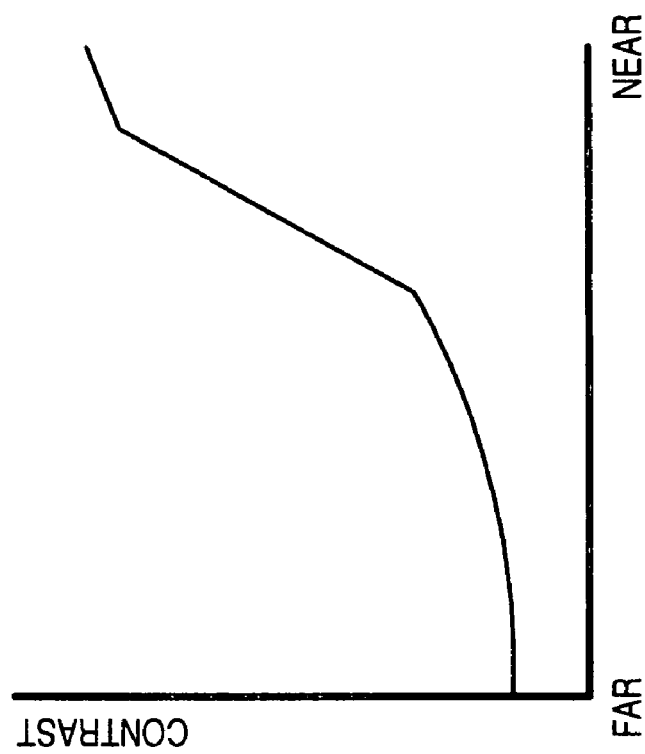
FIGS. 11A and 11B are diagrams showing examples of results of the detection of contrasts in a case where an unnecessary image is contained.
Figure 11B:
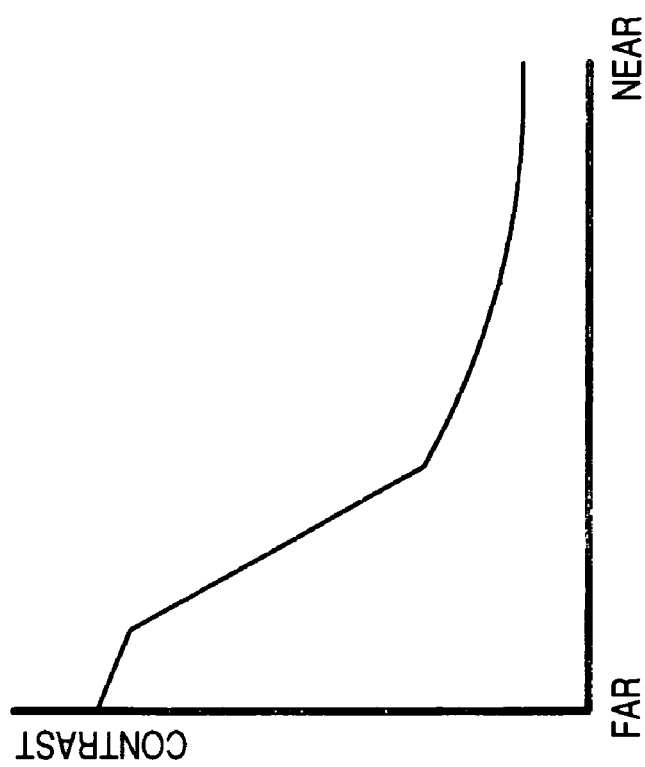

However, in a case where an unnecessary image is contained, the contrast in the area excluding an unnecessary image detection area does not change largely as in FIG. 11A, but the change in contrast in the unnecessary image detection area may have a peak as in FIG. 11B. Since an unnecessary subject such as a finger may be close to the imaging lens 11b, the peak of the contrast may occur if any unnecessary image is contained and when the focus lens is at the position on the widest side as in the example in FIG. 11B.

As described above, the determination processing in step S38 first determines that there is a higher possibility that an unnecessary image is contained if the peaks of contrasts exist in both of the unnecessary image detection area and the other area. In another example, the determination processing may determine that there is a higher possibility that an unnecessary image is contained irrespective of the contrast in the area excluding an unnecessary image detection area if the peak of the change in contrast in the unnecessary image detection area occurs or if the peak of the contrast occurs when the focus lens is positioned on the wide side.

In step S34, the ratio of the average brightness level Yc in the area excluding the unnecessary image detection area is obtained to the average brightness level Yb in the unnecessary image detection area. The condition for detecting an unnecessary image in step S38 is that the value of the ratio is higher than a predetermined threshold value (detection level Ya). As described above, since an unnecessary subject such as a finger is close to the imaging lens 11b, the subject may be darker on the imaged image. Accordingly, it is determined that there is a higher possibility that an unnecessary image is contained if it is determined that the area excluding the unnecessary image detection area is lighter by a predetermined extent than the unnecessary image detection area based on the comparison result in step S34. Therefore, it is important that the detection level Ya is at least equal to or higher than 1 and is desirably adequately larger than 1.

In step S37, the ratio of the average red component level Rb in the unnecessary image detection area is obtained to the average red component level Rc in the area excluding the unnecessary image detection area. The condition for detecting an unnecessary image in step S38 is that the value of the ratio is higher than a predetermined threshold value (detection level Ra). In a case where a part of a finger or hand of a photographer is imaged, the reflected light from the part or light through the part is imaged by the imaging device 12. Therefore, it is considered that the imaged signal may largely contain a color component close to red. Accordingly, it is determined that there is a higher possibility that an unnecessary image is contained if it is determined that the unnecessary image area has a higher red component detected level than the one in the area excluding the unnecessary image detection area by a predetermined extent based on the comparison result in step S37. Therefore, it is important that the detection level Ra is at least equal to or higher than 1 and is desirably adequately larger than 1.

As described above, in the imaging apparatus 1 according to this embodiment, the precision for detection can be improved by determining whether an unnecessary image is detected or not based on the three conditions whether the peak of the contrast in an unnecessary image detection area is detected or not, the relative darkness of the unnecessary image detection area and the relatively larger amount of the red component in the unnecessary image detection area. Particularly, unnecessary image detection with high precision and warning processing at high speed can be performed without increasing the manufacturing costs by suppressing the calculation load more than that in a case where the agreement with a preregistered pattern image is determined, for example, since the condition determination only includes simple calculation processing such as addition and subtraction mainly. In other words, by detecting an unnecessary image based on the three condition determinations implemented by simpler processing, both of the contradictory effects of the increase in precision of detection and speed of processing and the suppression of the processing load and manufacturing costs can be provided.

The increases in manufacturing/development costs of the apparatus and size of the circuits can be prevented since an unnecessary image can be detected based on an image signal obtained by imaging and the detection processing itself is not largely different from the processing performed in a signal processing system and/or control section in the past. Since an unnecessary image detection area can be predefined according to the specifications of the imaging apparatus to be installed, the possibility that a mistake photograph containing an unnecessary image is recorded can be lowered even in a case where the imaging lens 11b and/or the shutter release button 20a are placed relatively freely under the constraints for decreases in size and thickness. Particularly, by allowing the selection of an unnecessary image detection area and/or information indicating the degree of detection from preset multiple pieces of information, a same processing circuit and processing algorithm can be applied to multiple kinds of imaging apparatus in different specifications, which can suppress the manufacturing/development costs.

Even in a case where a photographer is warned of the fact that an unnecessary image has been detected, the processing of recording an imaged image can be performed by performing a full-push operation on the shutter release button 20a by a photographer. Therefore, since a photographer can determine whether an image even containing an unnecessary image, for example, is to be recorded or not by himself/herself, the opportunity of photographing by a photographer is not lost. Since a photographer does not have to set anything in advance for implementing detection/warning of an unnecessary image, the operability of a photographer for implementing the processing of detection/warning can be improved.

Having described that it is determined that an unnecessary image is detected in step S38 in FIG. 9 if all of the determination results in steps S31, S34 and S37 are "Yes", it may be determined that an unnecessary image is detected if at least two of the determination results are "Yes". For example, if the determination result in step S31 is "Yes" and one of the determination results in steps S34 and S37 is "Yes", it may be determined that an unnecessary image is detected.

The AF evaluation value to be used for determination of an unnecessary image may be a value excluding a contrast. For example, the detected level of a high frequency component from a target area within an imaged image may be used as the AF evaluation value. In this case, since the degree of focus increases as the amount of high frequency component increases, the same determination processing as that in a case with a contrast as described above is applicable. However, in a case where the detected level of a high frequency component is the AF evaluation value, the processing load may be larger though the precision of AF evaluation can be improved, compared with the case that a contrast is used. For that reason, the use of a contrast as the AF evaluation value is desirable in a case where the reduction of processing loads is strongly demanded, as in a cellular phone.

In the processing in steps S35 to S37, a more suitable specific color component for detection of a finger, for example, may be detected based on the signals of R, G and B components, instead of the detection of a red component from the R-component among the R, G and B components. The color detection in this case may be performed based on the color difference component converted based on the R, G and B components. In this case however, the determination based on the result of the detection of the R-component only among the R, G and B components can reduce the processing load more and can more easily increase the speed of processing.

In the processing of this embodiment as described above, even in a case an unnecessary image is detected, the fact is only warned in advance. The recording operation itself according to the full-push operation on the shutter release button 20a can be performed freely in judgment by a photographer. In a case where it is warned that an unnecessary image is detected though no unnecessary image is contained, a photographer can record the imaged image signal. For that reason, desirably, the increase in speed of the processing of detection of an unnecessary image may have a higher priority than the precision of detection, and the processing of detection and warning of an unnecessary image may be allowed in an extremely short time with no time lag. Therefore, it can be said that adopting a method with a light processing load as much as possible is more preferable as the method of detecting an AF evaluation value and the method of detecting a red component, for example.

Next, display examples of the warning image in a case where an unnecessary image has been detected will be described. FIGS. 12A and 12B and FIGS. 13A and 13B are diagrams showing display examples of the warning image.

Figure 12A:
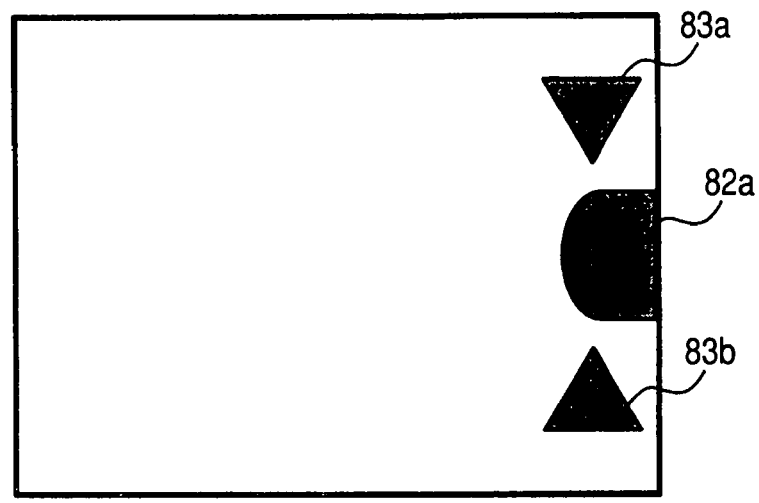
FIGS. 12A and 12B are diagrams (#1) showing display examples of a warning image.
Figure 12B:
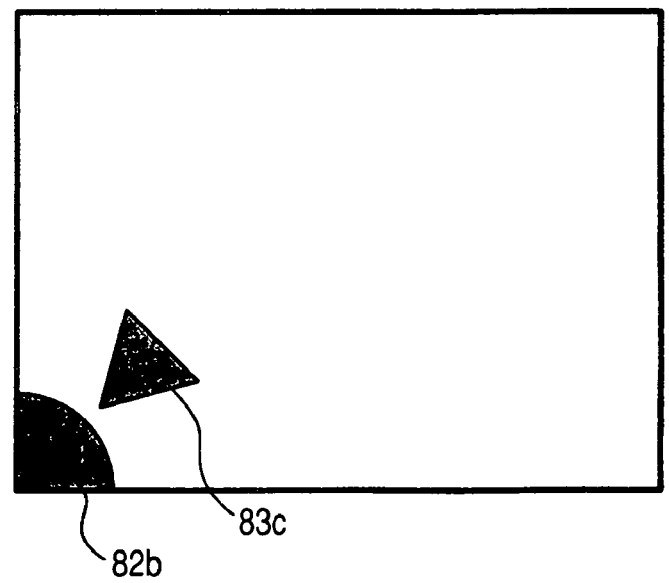

In the example in FIGS. 12A and 12B, the fact that an unnecessary image is detected is warned to a photographer by displaying a center position image 82 (82a and 82b) indicating the substantial center of the position where an unnecessary image is detected and an arrow image 83 (83a to 83c) indicating the center position image 82. FIGS. 12A and 12B correspond to the case where the areas A4 and A7 in FIGS. 5A and 5B are selected as the unnecessary image detection areas. The center position image 82 and the arrow image 83 are desirably displayed in a prominent color and brightness against the preview image on the background. For example, the arrow image 83 only or both of the center position image 82 and the arrow image 83 may brink.

Figure 13A:
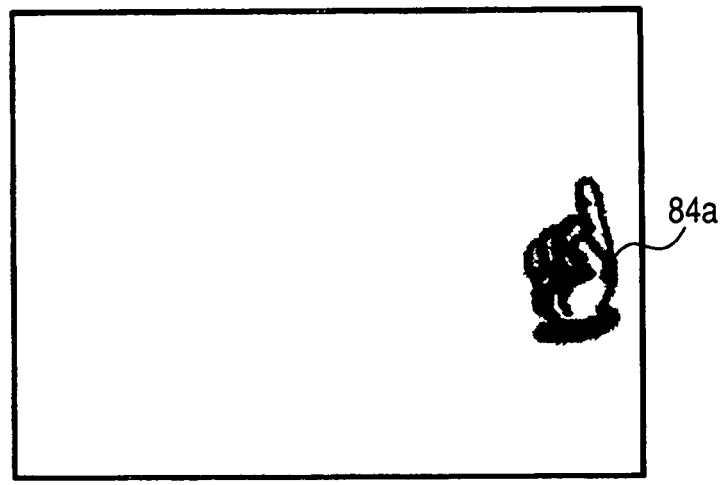
FIGS. 13A and 13B are diagrams (#2) showing display examples of a warning image.
Figure 13B:
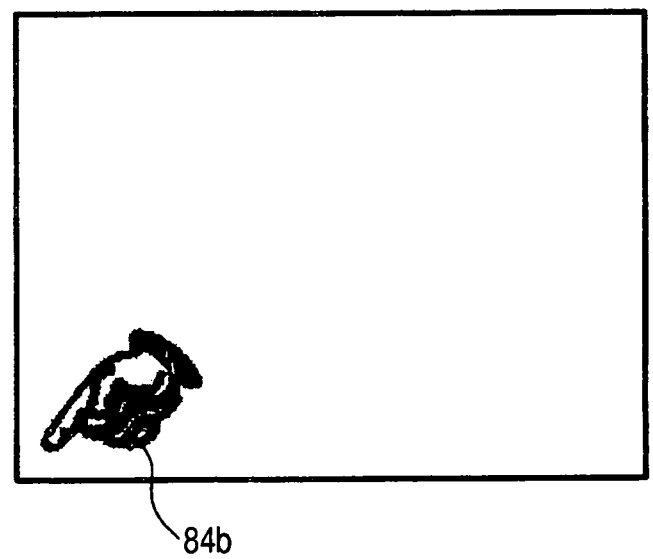

In the examples in FIGS. 13A and 13B, the fact that an unnecessary image is detected (particularly, an image of a finger is contained) is warned to a photographer by displaying images 84a and 84b rendering a finger near the position where an unnecessary image is detected. FIGS. 13A and 13B correspond to the case where the areas A4 and A7 in FIGS. 5A and 5B are selected as the unnecessary image detection area. Also in this case, the images 84a and 84b are desirably displayed in a prominent color and brightness against the preview image on the background and may brink.

Instead of the display of a warning image on the display 18 in this way, a special warning lamp may be provided around the display 18 for warning the detection of an unnecessary image. Furthermore, instead of the warning of the detection of an unnecessary image by which a photographer can recognize the fact visually, the warning may be provided by voice. Alternatively, the warning may be provided both by an image and voice.

A program is also provided that describes details of processing of processing functions in a case where the processing for detection and/or warning an unnecessary image is implemented by software processing by a CPU. In other words, by executing the program by a computer, the processing functions may be implemented on the computer. The program describing the processing details can be recorded on a computer-readable recording medium. The computer readable recording medium may be a magnetic recording medium such as a magnetic tape and a hard disk, an optical disk, a magneto-optical recording medium or a semiconductor memory, for example.

In order to put the program into circulation, portable recording mediums, such as optical disks, recording the program may be sold. The program may be stored in a storage device of a server computer, and the program can be transferred to another computer over a network.

A computer to execute the program may store the program recorded on a portable recording medium or transferred from a server computer to a storage device connecting to the computer. Then, the computer may load the program from the storage device and perform the processing according to the program. The computer may directly load the program from the portable recording medium and can perform processing according to the program. The computer can sequentially perform the processing according to a received program every time when the program is transferred from a server computer.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus that images an image with a solid-state imaging device comprising:
    an area defining section that defines an unnecessary image detection area, which may contain an unnecessary image, at a position along an outer edge of an imaged image obtained by the solid-state imaging device;
    a focus evaluation value calculating section that calculates a focus evaluation value, which indicates the focal degree, based on an image signal of the imaged image obtained through a gradually moved focus lens;
    a red component detecting section that calculates a first average red component level and a second average red component obtained by respectively averaging signal levels of red components in the unnecessary image detection area and a non-detection area which is an area excluding the unnecessary image detection area;
    an unnecessary image detection processing section that determines that the imaged image contains the unnecessary image if the focus evaluation value calculated based on an image signal in the unnecessary image detection area has a peak while the focus lens is moving and if a ratio of the first average red component level to the second average red component level is larger than a predetermined value; and
    a warning processing section that performs processing for warning a photographer of the fact that the unnecessary image is contained if it is determined.

2. The imaging apparatus according to claim 1, wherein the focus evaluation value calculating section calculates a contrast as the focus evaluation value.

3. The imaging apparatus according to claim 1, wherein the warning processing section causes a display unit to display image information for warning that the unnecessary image is contained.

4. The imaging apparatus according to claim 1, further comprising:
    a focus control section that moves the focus lens to a focus position by using the focus evaluation value calculated based on the image signal in the non-detection area, if it is determined that the unnecessary image is contained.

5. The imaging apparatus according to claim 4, wherein processing can be implemented that records the image signal of the imaged image on a recording medium according to an operation input from a photographer while the warning processing section is warning that the unnecessary image is contained.

6. The imaging apparatus according to claim 1, wherein the area defining section defines adjacent multiple divided areas as the unnecessary image detection area among divided areas resulting from the division of the imaged image into multiple areas.

7. An imaging apparatus that images an image with a solid-state imaging device comprising:
- an area defining section that defines an unnecessary image detection area, which may contain an unnecessary image, at a position along an outer edge of an imaged image obtained by the solid-state imaging device;
- a focus evaluation value calculating section that calculates a focus evaluation value, which indicates the focal degree, based on an image signal of the imaged image obtained through a gradually moved focus lens;
- an unnecessary image detection processing section that determines that the imaged image contains the unnecessary image if the focus evaluation value calculated based on an image signal in the unnecessary image detection area has a peak while the focus lens is moving;
- a warning processing section that performs processing for warning a photographer of the fact that the unnecessary image is contained if it is determined; and
- a brightness component detecting section that separately calculates each of the average brightness levels obtained by averaging signal levels of brightness components in the unnecessary image detection area and the non-detection area, which is the other area,
- wherein the unnecessary image detection processing section determines that the imaged image contains the unnecessary image if the focus evaluation value calculated based on the image signal in the unnecessary image detection area has a peak while the focus lens is moving and if the ratio of the average brightness level in the non-detection area to the average brightness level in the unnecessary image detection area is higher than a brightness threshold value, which is a value equal to or higher than 1.

8. An imaging apparatus that images an image with a solid-state imaging device comprising:
- an area defining section that defines an unnecessary image detection area, which may contain an unnecessary image, at a position along an outer edge of an imaged image obtained by the solid-state imaging device;
- a focus evaluation value calculating section that calculates a focus evaluation value, which indicates the focal degree, based on an image signal of the imaged image obtained through a gradually moved focus lens;
- an unnecessary image detection processing section that determines that the imaged image contains the unnecessary image if the focus evaluation value calculated based on an image signal in the unnecessary image detection area has a peak while the focus lens is moving;
- a warning processing section that performs processing for warning a photographer of the fact that the unnecessary image is contained if it is determined; and
- a red component detecting section that separately calculates each of the average red component levels obtained by averaging signal levels of red components in the unnecessary image detection area and the non-detection area, which is the other area,
- wherein the unnecessary image detection processing section determines that the imaged image contains the unnecessary image if the focus evaluation value calculated based on the image signal in the unnecessary image detection area has a peak while the focus lens is moving and if the ratio of the average red component level in the unnecessary image detection area to the average red component level in the non-detection area is higher than a red component threshold value, which is a value equal to or higher than 1.

9. An imaging apparatus that images an image with a solid-state imaging device comprising:
- an area defining section that defines an unnecessary image detection area, which may contain an unnecessary image, at a position along an outer edge of an imaged image obtained by the solid-state imaging device;
- a focus evaluation value calculating section that calculates a focus evaluation value, which indicates the focal degree, based on an image signal of the imaged image obtained through a gradually moved focus lens;
- an unnecessary image detection processing section that determines that the imaged image contains the unnecessary image if the focus evaluation value calculated based on an image signal in the unnecessary image detection area has a peak while the focus lens is moving;
- a warning processing section that performs processing for warning a photographer of the fact that the unnecessary image is contained if it is determined;
- a brightness component detecting section that separately calculates each of the average brightness levels obtained by averaging signal levels of brightness components in the unnecessary image detection area and the non-detection area, which is the other area; and
- a red component detecting section that separately calculates each of the average red component levels obtained by averaging signal levels of red components in the unnecessary image detection area and the non-detection area, which is the other area,
- wherein the unnecessary image detection processing section determines that the imaged image contains the unnecessary image if the focus evaluation value calculated based on the image signal in the unnecessary image detection area has a peak while the focus lens is moving, if the ratio of the average brightness level in the non-detection area to the average brightness level in the unnecessary image detection area is higher than a brightness threshold value, which is a value equal to or higher than 1, and if the ratio of the average red component level in the unnecessary image detection area to the average red component level in the non-detection area is higher than a red component threshold value, which is a value equal to or higher than 1.

10. An imaging apparatus that images an image with a solid-state imaging device comprising:
- an area defining section that defines an unnecessary image detection area, which may contain an unnecessary image, at a position along an outer edge of an imaged image obtained by the solid-state imaging device;
- a focus evaluation value calculating section that calculates a focus evaluation value, which indicates the focal degree, based on an image signal of the imaged image obtained through a gradually moved focus lens;
- an unnecessary image detection processing section that determines that the imaged image contains the unnecessary image if the focus evaluation value calculated based on an image signal in the unnecessary image detection area has a peak while the focus lens is moving;
- a warning processing section that performs processing for warning a photographer of the fact that the unnecessary image is contained if it is determined;
- a brightness component detecting section that separately calculates each of the average brightness levels obtained by averaging signal levels of brightness components in the unnecessary image detection area and the non-detection area, which is the other area; and a red component detecting section that separately calculates each of the average red component levels obtained by averaging signal levels of red components in the unnecessary image detection area and the non-detection area, which is the other area, wherein the unnecessary image detection processing section determines that the imaged image contains the unnecessary image if at least one of conditions is satisfied that the ratio of the average brightness level in the non-detection area to the average brightness level in the unnecessary image detection area is higher than a brightness threshold value, which is a value equal to or higher than 1, and that the ratio of the average red component level in the unnecessary image detection area to the average red component level in the non-detection area is higher than a red component threshold value, which is a value equal to or higher than 1, and if the focus evaluation value calculated based on the image signal in the unnecessary image detection area has a peak while the focus lens is moving.

11. An imaging method for imaging an image with a solid-state imaging device comprising the steps of:

defining, by an area defining section, an unnecessary image detection area, which may contain an unnecessary image, at a position along an outer edge of an imaged image obtained by the solid-state imaging device;

calculating, by a focus evaluation value calculating section, a focus evaluation value, which indicates the focal degree, based on an image signal of the imaged image obtained through a gradually moved focus lens;

calculating, by a red component detecting section, a first average red component level and a second average red component obtained by respectively averaging signal levels of red components in the unnecessary image detection area and a non-detection area which is an area excluding the unnecessary image detection area;

determining, by an unnecessary image detection processing section, that the imaged image contains the unnecessary image if the focus evaluation value calculated based on an image signal in the unnecessary image detection area has a peak while the focus lens is moving and if a ratio of the first average red component level to the second average red component level is larger than a predetermined value; and performing, by a warning processing section, processing for warning a photographer of the fact that the unnecessary image is contained if it is determined.

12. A computer readable recording medium having stored thereon an imaging program for imaging an image with a solid-state imaging device, the program causes a computer to function as:

an area defining section that defines an unnecessary image detection area, which may contain an unnecessary image, at a position along an outer edge of an imaged image obtained by the solid-state imaging device;

a focus evaluation value calculating section that calculates a focus evaluation value, which indicates the focal degree, based on an image signal of the imaged image obtained through a gradually moved focus lens;

a red component detecting section that calculates a first average red component level and a second average red component obtained by respectively averaging signal levels of red components in the unnecessary image detection area and a non-detection area which is an area excluding the unnecessary image detection area;

an unnecessary image detection processing section that determines that the imaged image contains the unnecessary image if the focus evaluation value calculated based on an image signal in the unnecessary image detection area has a peak while the focus lens is moving and if a ratio of the first average red component level to the second average red component level is larger than a predetermined value; and a warning processing section that performs processing for warning a photographer of the fact that the unnecessary image is contained if it is determined.

* * * * *